(12) United States Patent
Squires

(10) Patent No.: US 9,550,092 B2
(45) Date of Patent: Jan. 24, 2017

(54) HAND GRIP ASSEMBLY

(75) Inventor: Timothy P. Squires, Williamsburg, MI (US)

(73) Assignee: Hurricane Safety Systems, LLC, Traverse City, MI (US)

(*) Notice: Subject to any disclaimer, the term of this patent is extended or adjusted under 35 U.S.C. 154(b) by 0 days.

(21) Appl. No.: 13/555,266

(22) Filed: Jul. 23, 2012

(65) Prior Publication Data

US 2014/0020980 A1 Jan. 23, 2014

(51) Int. Cl.
*A63B 27/00* (2006.01)
*A01M 31/02* (2006.01)

(52) U.S. Cl.
CPC .............. *A63B 27/00* (2013.01); *A01M 31/02* (2013.01)

(58) Field of Classification Search
CPC .............................. A63B 27/00; A01M 31/02
USPC .................. 182/128, 129, 136, 187
See application file for complete search history.

(56) References Cited

U.S. PATENT DOCUMENTS

| | | | | |
|---|---|---|---|---|
| 2,401,251 A * | 5/1946 | Kelsey | ................... | B63B 27/14 |
| | | | | 182/106 |
| 3,609,905 A * | 10/1971 | Fuhrman | ............... | A01M 31/00 |
| | | | | 135/901 |
| 3,630,314 A * | 12/1971 | Bamburg | ............... | A01M 31/02 |
| | | | | 182/116 |
| 3,955,645 A * | 5/1976 | Dye | ....................... | A63B 27/00 |
| | | | | 182/135 |
| 4,168,765 A * | 9/1979 | Ferguson | ............... | A63B 27/02 |
| | | | | 182/135 |
| 4,243,121 A * | 1/1981 | Kiss | ....................... | E06C 1/525 |
| | | | | 182/196 |
| 4,249,683 A * | 2/1981 | Park | ....................... | B62D 43/02 |
| | | | | 182/129 |
| 4,595,076 A | 6/1986 | Gober | | |
| 4,600,081 A * | 7/1986 | Wade | .................... | A01M 31/02 |
| | | | | 108/152 |
| 4,721,183 A * | 1/1988 | Koniecka | .................. | A45F 3/26 |
| | | | | 108/152 |
| 4,727,961 A * | 3/1988 | Dawson | .................... | A45F 3/26 |
| | | | | 108/152 |
| 4,809,815 A * | 3/1989 | Wallace | ................. | A63B 27/00 |
| | | | | 182/133 |
| 5,040,635 A * | 8/1991 | Strickland | ............... | E06C 1/381 |
| | | | | 182/100 |
| D335,354 S * | 5/1993 | Phillips | ........................ | D25/68 |
| 5,311,967 A | 5/1994 | Kennedy | | |
| 5,371,966 A * | 12/1994 | Hall | ....................... | A01M 31/00 |
| | | | | 135/117 |
| 5,509,499 A * | 4/1996 | Prejean | ..................... | E06C 1/10 |
| | | | | 182/187 |
| 5,518,083 A * | 5/1996 | Blennert | ............... | A01M 31/02 |
| | | | | 182/188 |
| 5,538,101 A * | 7/1996 | Kempf | ...................... | A45F 3/26 |
| | | | | 182/116 |
| 5,810,113 A | 9/1998 | Jones | | |

(Continued)

*Primary Examiner* — Katherine Mitchell
*Assistant Examiner* — Shiref Mekhaeil
(74) *Attorney, Agent, or Firm* — Dinsmore & Shohl LLP

(57) ABSTRACT

A hand grip assembly for climbing a tree includes a handle grip portion. A handle bracket is attached to the handle grip portion. At least one mounting bracket is attached to the handle bracket. The mounting bracket includes an angled shape for engaging a surface of the tree. A harness is attached to the handle bracket. The harness cinches about the tree and secures the hand grip assembly relative to the tree.

9 Claims, 2 Drawing Sheets

(56) References Cited

U.S. PATENT DOCUMENTS

| | | | | |
|---|---|---|---|---|
| 5,975,242 | A | * | 11/1999 | Woller .................. A01M 31/02 182/135 |
| 5,979,603 | A | * | 11/1999 | Woller ..................... A45F 3/26 182/135 |
| 6,264,000 | B1 | * | 7/2001 | Johnson ................ A01M 31/02 182/136 |
| 6,578,913 | B2 | | 6/2003 | Wilhelm |
| 6,830,128 | B2 | * | 12/2004 | Burgeson .............. A01M 31/02 182/116 |
| 7,124,992 | B1 | * | 10/2006 | Colledge ................ B25H 1/005 108/152 |
| 7,156,206 | B2 | * | 1/2007 | Prejean ................ A01M 31/02 182/136 |
| 8,794,384 | B1 | * | 8/2014 | Holford ................ A01M 31/02 182/187 |
| 2002/0043430 | A1 | | 4/2002 | Johnson |
| 2003/0178255 | A1 | * | 9/2003 | Auer .................... A01M 31/00 182/187 |
| 2004/0238279 | A1 | | 12/2004 | Johnson |
| 2007/0000163 | A1 | * | 1/2007 | Buckner ................ F41A 23/02 42/94 |
| 2007/0151802 | A1 | * | 7/2007 | Tillitski ................... A62B 1/14 182/133 |
| 2013/0341475 | A1 | * | 12/2013 | Thompson ............ A01M 31/02 248/217.4 |

\* cited by examiner

HAND GRIP ASSEMBLY

FIELD OF THE INVENTION

The invention relates to hand grip assemblies for climbing trees and other objects.

BACKGROUND OF THE INVENTION

Typically tree stands and hunting blinds may be positioned in a tree above a surface of the ground to allow a hunter a broader view of a hunting area. Often a hunter must climb up a ladder or other device to enter the tree stand. As a hunter climbs up the ladder and is positioned to enter the tree stand, the hunter may often have to hold onto the tree and swing himself into the tree stand.

It would be desirable for a hunter to have a grip or other assisting mechanism attached to the tree to allow the hunter a secure handhold on the tree while entering the tree stand. There is therefore a need in the art for a hand grip assembly that may be attached to a tree at a desired position to allow a secure grip on the tree when entering and leaving a tree stand. There is also a need in the art for a hand grip assembly that may be removably attached to various objects such as a tree or pole to allow a secure hand grip when climbing the object.

SUMMARY OF THE INVENTION

In one aspect, there is disclosed a hand grip assembly for climbing a tree. The hand grip assembly includes a handle grip portion. At least one mounting bracket is connected with the handle grip portion. The mounting bracket includes an angled shape for engaging a surface of a tree. A harness is connected with the mounting bracket. The harness cinches about the tree and secures the mounting bracket relative to the tree.

In another aspect, there is disclosed a hand grip assembly for climbing a tree. The hand grip assembly includes a handle grip portion. A handle bracket is attached to the handle grip portion. At least one mounting bracket is attached to the handle bracket. The mounting bracket includes an angled shape for engaging a surface of the tree. A harness is attached to the handle bracket. The harness cinches about the tree and secures the hand grip assembly relative to the tree.

DETAILED DESCRIPTION OF THE PREFERRED EMBODIMENTS

Figure 1:
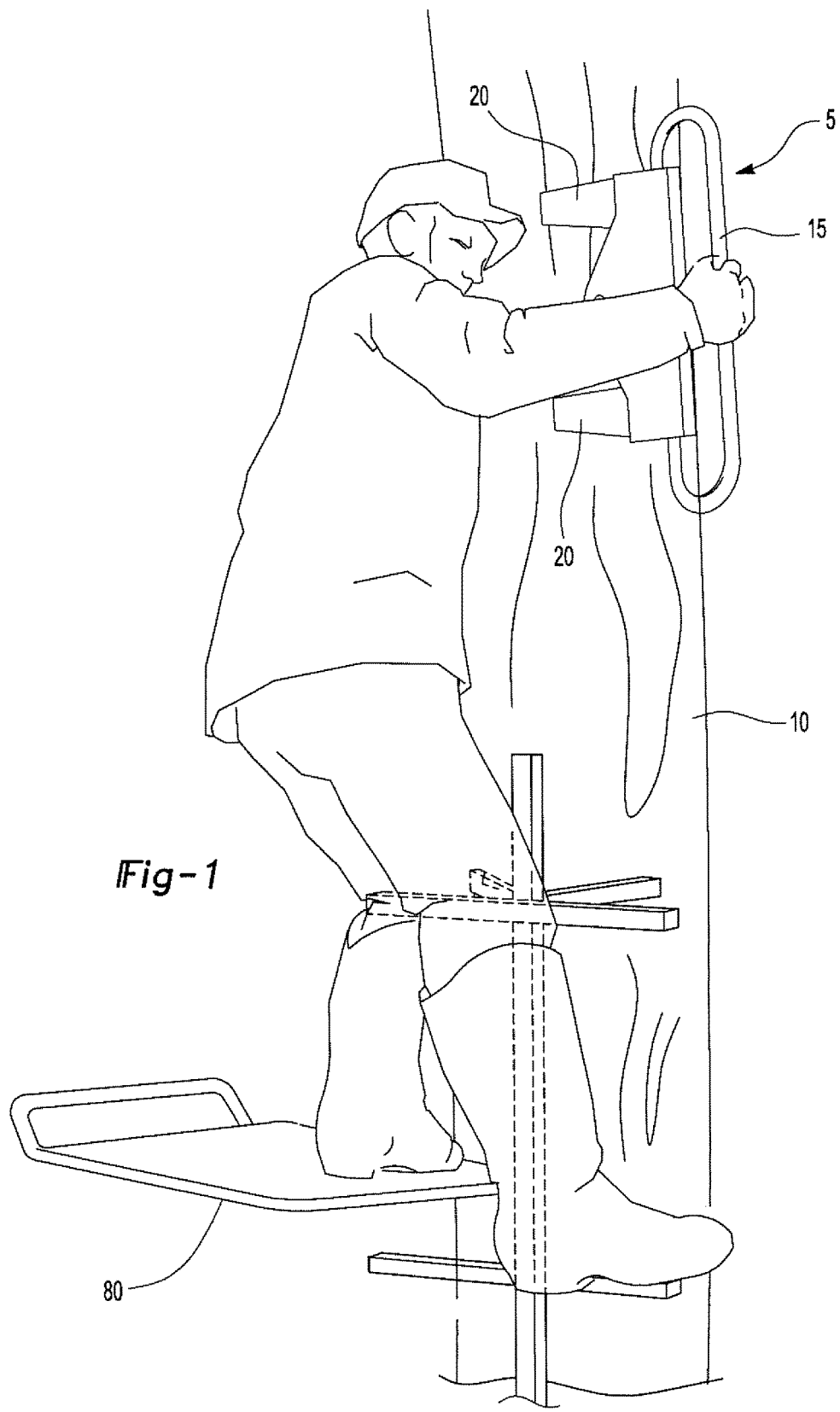
FIG. 1 is a partial perspective view of a person climbing up a tree stand ladder and entering a tree stand with a handle grip assembly attached to the tree.

Referring to the various figures, there is shown a handle grip assembly 5 for climbing a tree or other object such as a pole or column 10. In one aspect, the hand grip assembly 5 includes a handle grip portion 15. At least one mounting bracket 20, with two being shown, may be connected with the handle grip portion 15. The mounting bracket 20 includes an angled shape 25 for engaging a surface of the tree 10. A harness 30 may be connected with the mounting bracket 20. The harness 30 cinches about the tree 10 and secures the mounting bracket 20 relative to the tree.

Figure 2:
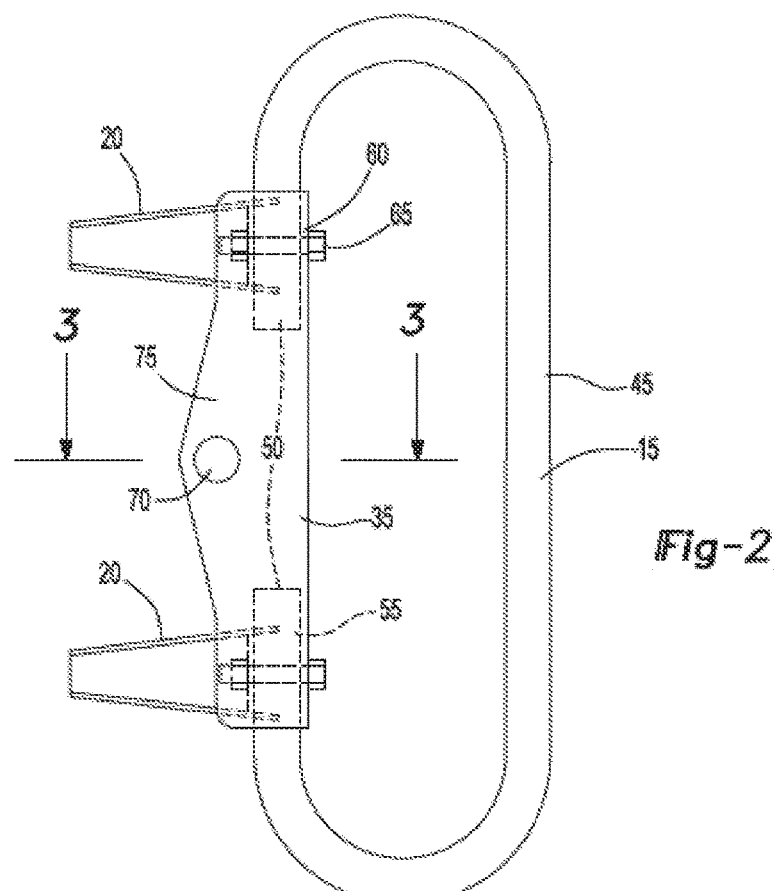
FIG. 2 is a side view of a handle grip assembly.

Referring to FIG. 2, a handle bracket 35 may be attached to the handle grip portion 15 and the at least one mounting bracket 20. In the detailed figure there are provided two mounting brackets 20 attached to the handle grip portion 15. In one aspect, the handle bracket 35 includes an angled shape 40 that is complementary with the angled shape 25 of the mounting bracket 20. The handle grip portion 15 may include a cylindrical rod shaped into a semi-oval body 45 that terminates at opposing ends 50. The opposing ends 50 of the semi-oval body 45 may be received in a cavity 55 defined by the angled shape 40 of the handle bracket 35. In one aspect, the handle grip portion 15 may extend approximately normal to the handle bracket 35. In another aspect the handle grip portion 15 may be positioned at an angle less than normal to the handle bracket 35.

The handle bracket 35 may include through holes 60 formed in an apex 67 of the angled shape 40. The through holes 60 may receive a fastener 65 coupling the grip portion 15, mounting bracket 20, and handle bracket 35. The through holes may have various shapes to allow for positioning the handle grip 15 relative to the handle bracket 35. In one aspect, the handle bracket 35 may include attachment holes 70 formed thereon on opposing surfaces 75 relative to the apex 67. The harness 30 may be attached to the opposing attachment holes 70 and be tightened about the tree 10 securing the hand grip assembly 5 relative to the tree 10.

Various harnesses 30 may be utilized. For example, the harness 30 may be a strap, chain, cable, or rope. Additionally, the harness 30 may include hooks attached at ends of the harness 30 such that the hooks may be received in the opposing attachment holes 70. Other attachment features other than hooks may be attached at the ends of the harness 30 allowing attachment with the handle bracket 35.

As stated above, the mounting bracket 20 includes an angled shape. In one aspect, the angle may be from 80 to 90 degrees between opposing sides of the mounting bracket 20. In one aspect, the mounting bracket 20 may include an angle of 85 degrees between the opposing sides of the mounting bracket 20.

Figure 3:
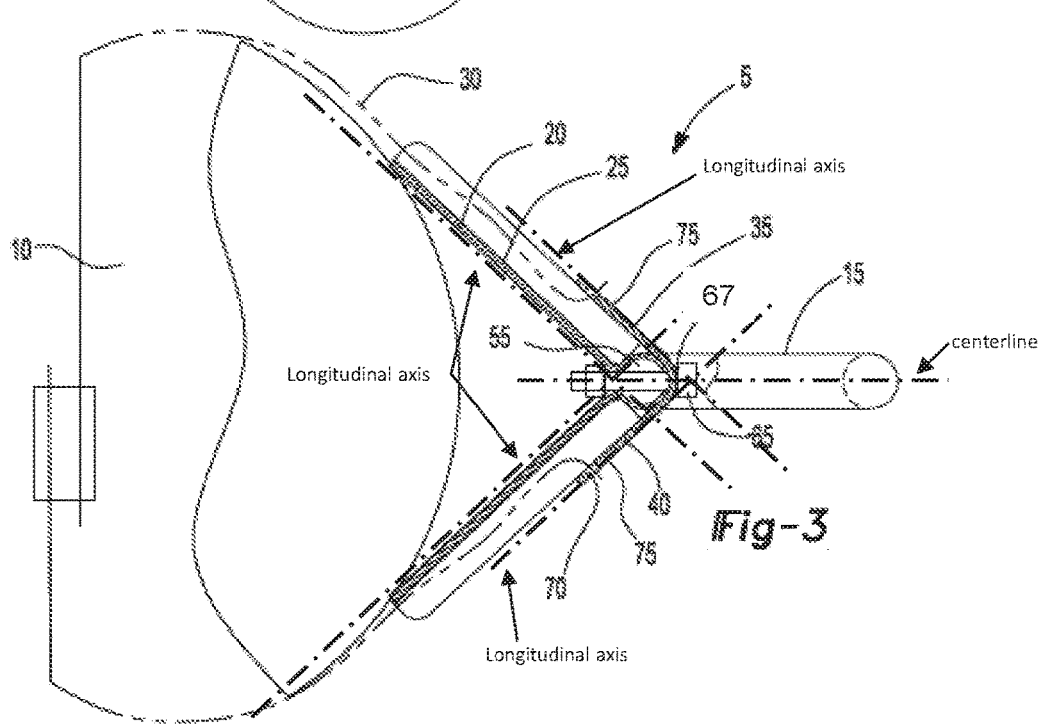
FIG. 3 is a partial sectional view of a handle grip assembly showing the handle grip assembly attached to a tree.

As shown in the depicted embodiment, a hand grip assembly 5 may include a handle grip portion 15. A handle bracket 35 may be attached to the handle grip portion 15. The at least one mounting bracket 20 may be attached to the handle bracket 35. The mounting bracket 20 includes an angled shape 25 for engaging a surface of the tree 10 as best shown in FIG. 3. A harness 30 may be attached to the handle bracket 35 such that the harness 30 may be cinched about the tree 10 securing the hand grip assembly 5 relative to the tree 10. Alternatively, the handle grip 15 may be attached to the mounting bracket 20 and the harness 30 may be connected with the mounting bracket 20 such that the harness cinches about a tree securing the mounting bracket 20 to the tree 10.

In use, a user may assemble the handle grip portion 15, at least one mounting bracket 20, and the handle bracket 35 utilizing appropriate fasteners 65 that are positioned in holes formed in the apex of the angled shapes 25, 40 of the mounting bracket 20 and handle bracket 35 respectively. In this manner, the grip portion 15, mounting bracket 20, and handle bracket 35 may be connected together.

The user may then scale a ladder or other device attached to the tree 10 and attach the hand grip assembly 5 at an appropriate height to allow for secure hand support when entering and leaving a tree stand 80 attached to the tree 10. The user may attach the hand grip assembly 5 by positioning the angled surfaces 25 of the mounting brackets 20 against the tree 20 and tightening the harness 30 that is attached to the opposing attachment holes 70 of the handle bracket 35. In one aspect, a tensioning device as disclosed in U.S. Provisional Application No. 61/555,612 filed on Nov. 4, 2011 which is incorporated by reference in its entirety, may be provided and attached to the harness 30 such that a user may securely attach the hand grip assembly 5 to the tree or other object 10.

As the user tensions the harness 30 about the tree 10, the angled surface 25 of the mounting bracket 20 engages the surface of the tree 10 securely positioning the hand grip assembly 5 relative to the tree 10.

It should be realized that various shapes of the handle grip portion 15 may be utilized. For example, rectangular or other shaped handle grips may be provided. Additionally, a handle grip 15 may include a knurled surface or other gripping shape such as an indentation, bumps, or other type of surface. Additionally, the handle grip portion 15 may be provided with an additional gripping surface such as a tape or other type of implement.

The invention has been described in an illustrative manner. It is to be understood that the terminology, which has been used, is intended to be in the nature of words of description rather than limitation. Many modifications and variations of the invention are possible in light of the above teachings. Therefore, within the scope of the appended claims, the invention may be practiced other than as specifically described.

The invention claimed is:

1. A hand grip assembly for climbing a tree comprising:
   a handle grip portion including a centerline; the handle grip portion includes a cylindrical rod shaped into a discontinuous rounded body terminating at opposing ends
   at least one mounting bracket connected with the handle grip portion, the mounting bracket having a first angled shape for engaging a surface of a tree, the at least one mounting bracket including a longitudinal axis of opposing sides of said first angled shape of the mounting bracket;
   a handle bracket intermediate to the handle grip portion and the at least one mounting bracket, the handle bracket coupling to the mounting bracket and connecting the mounting bracket to the handle grip portion;
   a harness for cinching about the tree and for securing the mounting bracket;
   wherein the handle grip portion is attached to the mounting bracket along the centerline and at an intersection of the longitudinal axes of each opposing side of the mounting bracket wherein said handle bracket having a second angled shape wherein opposing sides of said second angled shape of said handle bracket are parallel to said opposing sides of said first angled shape of said mounting bracket respectively.

2. The hand grip assembly of claim 1 wherein the opposing ends of the discontinuous rounded body are received in a cavity defined by the angled shape of the handle bracket.

3. The hand grip assembly of claim 1 including two mounting brackets attached to the handle bracket.

4. The hand grip assembly of claim 1 wherein the handle bracket includes through holes formed in intersection of longitudinal axes of each opposing side of said second angled shape of the handle bracket, the through holes receiving a fastener coupling the grip portion, mounting bracket and handle bracket.

5. The hand grip assembly of claim 4 wherein the handle bracket includes attachment holes formed therein on opposing surfaces.

6. The hand grip assembly of claim 5 wherein the harness is attached to the opposing attachment holes for securing the hand grip assembly.

7. The hand grip assembly of claim 1 wherein the harness is selected from the group consisting of straps, chains, cables and ropes.

8. The hand grip assembly of claim 1 wherein the mounting bracket has an angle of from 80 to 90 degrees measured between opposing faces of the mounting bracket.

9. The hand grip assembly of claim 1 wherein the mounting bracket has an angle of 85 degrees measured between opposing faces of the mounting bracket.

* * * * *